(12) United States Patent
Ravenel et al.

(10) Patent No.: US 9,444,932 B2
(45) Date of Patent: Sep. 13, 2016

(54) SYSTEM AND METHOD OF PROVIDING DIGITAL MEDIA MANAGEMENT IN A QUICK SERVICE RESTAURANT ENVIRONMENT

(75) Inventors: J. Patrick Ravenel, Escondido, CA (US); Trevor Chong, Corona Del Mar, CA (US); John Silva, San Diego, CA (US)

(73) Assignee: Tillster, Inc., San Diego, CA (US)

( * ) Notice: Subject to any disclaimer, the term of this patent is extended or adjusted under 35 U.S.C. 154(b) by 838 days.

(21) Appl. No.: 12/506,921

(22) Filed: Jul. 21, 2009

(65) Prior Publication Data

US 2010/0042506 A1 Feb. 18, 2010

Related U.S. Application Data

(60) Provisional application No. 61/082,409, filed on Jul. 21, 2008.

(51) Int. Cl.
| | | |
|---|---|---|
| *G06Q 20/18* | (2012.01) | |
| *G06Q 20/20* | (2012.01) | |
| *H04M 3/42* | (2006.01) | |
| *G06Q 10/06* | (2012.01) | |
| *G06F 17/30* | (2006.01) | |
| *G06Q 20/12* | (2012.01) | |
| *G07F 17/00* | (2006.01) | |
| *H04M 3/20* | (2006.01) | |
| *H04M 3/22* | (2006.01) | |
| *H04M 3/46* | (2006.01) | |
| *H04M 7/00* | (2006.01) | |

(52) U.S. Cl.
CPC .... *H04M 3/42323* (2013.01); *G06F 17/30575* (2013.01); *G06Q 10/0631* (2013.01); *G06Q 20/123* (2013.01); *G06Q 20/18* (2013.01); *G06Q 20/20* (2013.01); *G06Q 20/202* (2013.01); *G07F 17/0014* (2013.01); *H04M 3/20* (2013.01); *H04M 3/2281* (2013.01); *H04M 3/42187* (2013.01); *H04M 3/465* (2013.01); *H04M 7/006* (2013.01)

(58) Field of Classification Search
None
See application file for complete search history.

(56) References Cited

U.S. PATENT DOCUMENTS 5,845,263 A * 12/1998 Camaisa et al. ............... 705/15
6,038,545 A *  3/2000 Mandeberg et al. .......... 705/15
6,633,851 B1 * 10/2003 Engler et al. .................. 705/21

(Continued)

OTHER PUBLICATIONS

The Examiner defines "synchronize" as "to cause to go on, move, operate, work, etc., at the same rate and exactly together: They synchronized their steps and walked on together." See Random House Dictionary (2012).*

(Continued)

*Primary Examiner* — Peter L. Ludwig
(74) *Attorney, Agent, or Firm* — Knobbe, Martens, Olson & Bear, LLP

(57) ABSTRACT

Embodiments disclosed herein are directed to systems and methods for managing digital media content within a quick service restaurant environment to provide a consistent visual experience and accurate, timely data across various digital media displays to QSR customers. In some embodiments, a digital media management appliance ("DMMA") is used to manage the distribution of digital media data which is used to drive various display devices present in the QSR environment. The DMMA may be configured to extract data from a point of sale ("POS") system and/or other data sources within the QSR environment in order to generate display data for the digital media devices in the store.

13 Claims, 11 Drawing Sheets

(56) References Cited

U.S. PATENT DOCUMENTS

| | | | |
|---|---|---|---|
| 6,871,325 B1* | 3/2005 | McNally et al. | 715/810 |
| 7,328,174 B2* | 2/2008 | Baratz | 705/26.81 |
| 7,747,467 B2* | 6/2010 | Minakuchi | 705/26.61 |
| 7,774,236 B2* | 8/2010 | Steres et al. | 705/27.1 |
| 2002/0078459 A1 | 6/2002 | McKay | |
| 2002/0095342 A1* | 7/2002 | Feldman et al. | 705/15 |
| 2002/0143655 A1* | 10/2002 | Elston et al. | 705/26 |
| 2003/0074285 A1* | 4/2003 | Hoffman et al. | 705/30 |
| 2003/0083936 A1* | 5/2003 | Mueller et al. | 705/14 |
| 2004/0138954 A1* | 7/2004 | Norton et al. | 705/16 |
| 2004/0158499 A1* | 8/2004 | Dev et al. | 705/26 |
| 2005/0182680 A1* | 8/2005 | Jones et al. | 705/15 |
| 2006/0282398 A1* | 12/2006 | Mueller et al. | 705/400 |
| 2007/0282763 A1 | 12/2007 | Lee | |
| 2008/0120154 A1* | 5/2008 | Dellovo | 705/7 |
| 2008/0172296 A1* | 7/2008 | Masucci et al. | 705/14 |
| 2008/0270230 A1* | 10/2008 | Hendrickson et al. | 705/14 |
| 2008/0313062 A1* | 12/2008 | Williams et al. | 705/30 |
| 2009/0132492 A1* | 5/2009 | Satoh et al. | 707/3 |
| 2009/0259554 A1* | 10/2009 | Carroll et al. | 705/17 |
| 2009/0259557 A1* | 10/2009 | Carroll et al. | 705/17 |

OTHER PUBLICATIONS

PCT Search Report in PCT/US2009/051309.
Extended European Search Report dated Feb. 25, 2016 for corresponding patent application EP 09800902.0.

* cited by examiner

SYSTEM AND METHOD OF PROVIDING DIGITAL MEDIA MANAGEMENT IN A QUICK SERVICE RESTAURANT ENVIRONMENT

RELATED APPLICATIONS

This application claims the benefit of U.S. Provisional Patent Application No. 61/082,409, filed on Jul. 21, 2008, the entire disclosure of which is hereby incorporated by reference in its entirety.

BACKGROUND OF THE INVENTION

1. Field of the Invention

This application relates to system integration and information translation from a point of sale (POS) server to digital display devices which operate in a quick service restaurant environment. In particular, this application relates to systems and methods for providing digital media management services in a quick service restaurant environment.

2. Description of the Related Technology

In a quick service restaurant ("QSR") environment, digital displays are replacing physical displays. Digital displays and network ordering devices may include various different types of display devices. For example QSR's may implement digital menu boards which are configured to present their guests with the various food and drink items available for ordering. Order confirmation boards may also be provided which provide visual confirmation of the items ordered by a QSR customer. Some QSR's now utilize digital marketing displays that take the form of digital signs or television screens that are used to promote specific product items or more generally promote the QSR brand. These digital marketing displays may either replace or complement traditional poster-board marketing materials that are present in a QSR. Today's QSR's may also implement self-service ordering kiosks for placing food and drink orders. These kiosks typically include digital display interfaces which allow customers to place food and drink orders without the assistance of QSR personnel. Existing QSR digital display implementations create complicated cost issues for QSR's (which typically operate on a low profit margin) because they can be expensive to configure and maintain.

SUMMARY

In one embodiment, a system for managing digital display content in a quick service restaurant environment is provided. The system may include a digital media delivery module configured to generate digital media data for a plurality of digital media devices in the quick service restaurant environment. A memory may be provided to store the digital media data. The system also may include a point of sale interface configured to communicate with a point of sale system in the quick service restaurant environment, and a translation module configured to receive the generated digital media data from the memory and translate the received data into a format readable by the point of sale system.

In some embodiments, the digital media delivery module may include at least one or more of a kiosk engine, a digital marketing display engine, an order confirmation display engine, and a digital menu display engine. The kiosk engine may be configured to transmit menu data to a kiosk device for display on the kiosk device. The digital marketing display engine may include software configured to play multimedia files on a digital marketing display device. In some additional aspects, the digital display device may comprise at least one of a LCD television device and a plasma television device, the device in communication with the digital marketing display engine via at least one of a DVI interface and a HDMI interface.

The digital media delivery module may also include a web ordering engine configured to generate web pages for ordering products in the QSR environment. The system may also include a media design module configured to generate digital media data and transmit the digital media data for storage in the memory configured to store digital media data. The media design module may include a database comprising menu data, store data, and promotional data; a hosted menu building application configured to generate digital display menus; and a network interface configured to transmit the generated digital display menus over a computer network. In certain implementations, the media design module may further include a store marketing media design application.

Some embodiments include a synchronization module configured to maintain consistency between digital media data and point of sale data. Further embodiment include a digital media delivery module which is further configured to modify the digital display data based on inventory data stored in the point of sale system.

In additional embodiments, a method of managing digital display content in a quick service restaurant environment is provided. The method includes generating digital media data for a plurality of digital media devices in the quick service restaurant environment and storing the digital media data. The method further includes communicating with a point of sale system in the quick service restaurant environment and translating the stored digital media data into a format readable by the point of sale system.

BRIEF DESCRIPTION OF THE DRAWINGS

In this description, reference is made to the drawings wherein like parts are designated with like numerals throughout.

DETAILED DESCRIPTION OF CERTAIN INVENTIVE EMBODIMENTS

Figure 1:
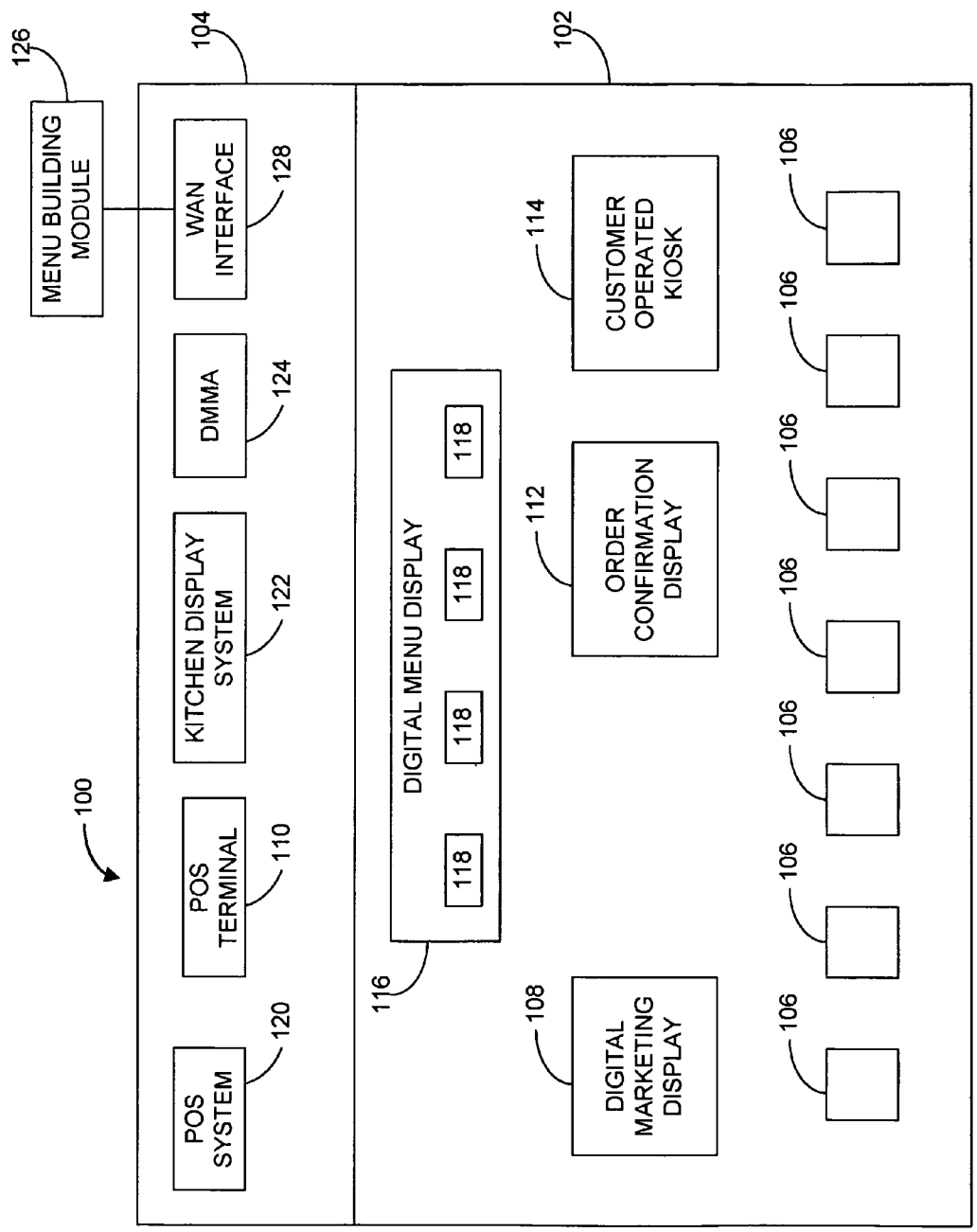
FIG. 1 is an example of a restaurant environment suitable for implementing various embodiments described herein.

Embodiments disclosed herein are directed to systems and methods for managing digital media content within a quick service restaurant environment to provide a consistent visual experience and accurate, timely data across various digital media displays to QSR customers. In some embodiments, one or more digital media management appliance ("DMMA") are used to manage the distribution of digital media data which is used to drive various display devices present in the QSR environment. The DMMA may be configured to extract data from a point of sale ("POS") system and/or other data sources within the QSR environment in order to generate display data for the digital media devices in the store.

The inventors have recognized that existing QSR digital display implementations create complicated cost issues for QSR's (which typically operate on a low profit margin) because they are not vendor neutral and/or integrated. In general, each of these point solutions has not only its own hardware but also its own software for managing the solution. The use of these types of disparate tools and systems is error-prone, cumbersome and costly. As a result, it is desirable to achieve a single set of media design and management tools, integrated with the POS and vendor neutral.

Because QSR franchisors often allow their franchisees to select different POS systems from a plurality of POS vendors, the DMMA may be decoupled from the POS in order to alleviate the need to consider the POS structure when generating content that is to be displayed on the display devices within the store. This decoupling may help to ensure that the effectiveness of the display devices is not compromised by an inflexible POS server. As a result, a single DMMA can interface with different types of POS servers without needing to restructure or rewrite the DMMA software code or redesign the way in which data is presented within the digital displays. The DMMA allows POS servers to be used interchangeably and allows for easier software updates related to the management of digital displays and network ordering devices driven by POS server data. The DMMA may include a synchronization service which allows for real time POS system data to be used to maintain and update digital media within the store. For example, the synchronization service may be configured to monitor inventory data in a POS system and remove menu items and/or item promotions from the digital media in the QSR if a particular item is no longer available. Similarly, each of the different types of digital display devices (menu boards, kiosks, order confirmation boards, digital marketing boards, etc.) may all be from different vendors. The QSR brand wants a single integrated experience for both those persons designing and maintaining in-store media, and also for their consumers independent of any differences in IT infrastructure and vendor implementations. In other aspects, a media design module may be provided which allows QSR's to generate digital menus and other types of brand-related promotional media in such a way that all customer-facing digital media displays present a consistent theme and branding experience. The menu building module may take the form of a hosted application which may interface with a plurality of DMMA's at a plurality of QSR's to deliver digital media content on a location-by-location basis. This distributed implementation allows for a single point of control for all customer-facing media in stores across a QSR brand which is integrated with the POS system.

FIG. 1 is an example of a restaurant environment 100 suitable for implementing various embodiments described herein. The restaurant environment 100 may be a QSR or some other type of food and drink service environment. In the example shown in FIG. 1, the restaurant environment is a QSR environment 100. The QSR environment 100 may be divided into two general areas: a customer-present area 102 and an operations area 104. The customer present area 102 is the area of the QSR environment 100 which is used for the purpose of serving QSR customers 106 (shown in the customer-present area 102 of FIG. 1). The customer present area 102 may include a lobby, a seating area, an ordering area, an outdoor sidewalk, or some other area in which customers 106 are generally permitted to be present within the store. The customer present area 102 may also include a drive thru area (not shown) in which customers place and receive food orders from their automobiles. The operations area 104 generally includes those areas within the QSR environment 100 in which the customers are not allowed. The operations area 104 may include the kitchen area, the area behind an ordering counter, the back office area, and other areas within the QSR environment 100.

The customer present area 102 may include various customer facing digital media display devices. A "customer facing" digital media device is a device which includes an electronic display that is intended to be primarily shown to the customer (as opposed to QSR employees). The digital media devices may be connected by a store network. Various types of customer facing digital media devices may be present in the customer present area 102 of the QSR environment 100. For example, the customer present environment 102 may include one or more digital marketing displays 108. The digital marketing displays 108 may be used in order to provide point of purchase marketing of the QSR's products to the customers 106. The digital marketing displays 108 are typically located throughout the QSR environment 100 in locations viewable by QSR customers 106. The digital marketing displays may advertise QSR products and deliver visual content designed to extend the QSR brand within the store 100. By way of example and not of limitation, the digital marketing displays 108 may display information about product promotions, QSR-related events, advertising, or even QSR-branded television programming. In some embodiments, the marketing display may be configured to display internet protocol television data that is transmitted to the display via a network connection within the QSR environment 100.

Digital media display devices may include one or more digital menu displays 116. The digital menu display 116 may take the form of a digital menu board 116 which displays a menu of items 118 that may be ordered by QSR customers 106. The digital menu board 116 may be a large liquid crystal display (LCD) device or some other type of digital display. The digital menu display 116 is typically positioned in the QSR environment 100 in a central location that is viewable by the QSR customers 106 at the time they place their orders.

The QSR environment 100 may further include an order confirmation display 112. The order confirmation display 112 may be an order confirmation board ("OCB") as is known in the art. When a customer places an order with a customer service representative at a POS terminal 110 (which will be discussed below), the order confirmation display 112 may be configured to display to the customer 106 the details of the order they have placed so that the customer may confirm the correctness of their order. Order confirmation displays 112 may also be present outside the restaurant in a drive thru ordering location. These order confirmation displays allow customers ordering from their automobiles can to see their order as it is input into the POS system 120. Although order confirmation displays 112 are primarily used to allow customers 106 to confirm the accuracy of their order as it is input into the POS system 120, in some embodiments, the order confirmation displays may be configured to display additional information. For example, in one embodiment, the order confirmation display 112 may be configured to display promotional items to the customer 106. The promotional items may be presented in a specific area of the display while the remainder of the display is used to display customer order information. By displaying the promotional information along with the order confirmation information, the order confirmation display 112 may be used to provide an "up sell" opportunity to the QSR, as well as providing an opportunity to expose the customer 106 to additional brand image impressions. In some embodiments, the order confirmation display 350 displays both advertising and offers of additional food or drink items. For example, the order confirmation board may display to the customer an offer of, "Want bacon for only $0.50 more?"

Another display device that may be present in the QSR environment 100 may be a customer-operated ordering kiosk 114. The kiosk 114 may include a graphical user interface touch-screen display that may be used by the customers 106 to place orders in the QSR 100 without needing the assistance of a customer service representative. The kiosk 114 may be configured to display a digital touch-screen menu to customers 106 and process food and drink orders which are transmitted to a point of sale ("POS") system 120 located in the operations area 104 of the QSR environment 100.

As noted above, the operations area 104 of the QSR environment 100 generally includes those areas within the QSR environment 100 in which the customers are not allowed. While the operations area 104 may include various display devices such as POS terminals 110 and kitchen display systems 122, these display devices are not typically "customer facing" display devices intended to provide a enhanced visual experience to the customer. Rather, these display devices are intended to be used by QSR employees to help them work more efficiently.

The operations area 104 of the QSR environment 100 may include a point of sale ("POS") system 120. The POS system 120, which is described in additional detail below, is a computer system which includes hardware and/or software which allows the QSR to more efficiently manage its operations. The POS system 120 may include one or more POS terminals 110 (also commonly known as cash registers). The POS terminals 110 are typically located behind an ordering counter in the QSR environment 100, and are used by QSR employees to input customer orders into the POS system. Because QSR employees may be trained to use the POS terminals 110, the POS terminals typically do not have a sophisticated and easy to use user interface like those usually provided with customer facing ordering devices (such as kiosk 114, for example).

As noted briefly above, the operations area 104 may also include one or more kitchen display systems ("KDS") 122. A KDS is a system that communicates with the POS system 120, usually via the store's local area network, which allows the food preparation workers in the QSR 100 to view and manage the orders which have been entered into the POS system 120.

Figure 3:
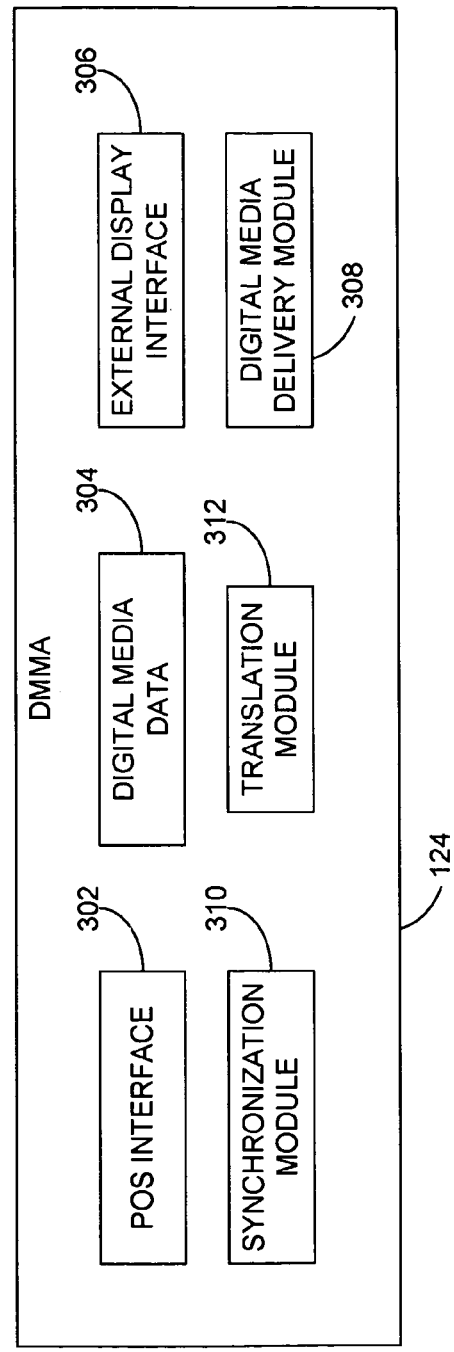
FIG. 3 is a block diagram providing a more detailed view of the digital media management appliance from FIG. 1.
Figure 4:
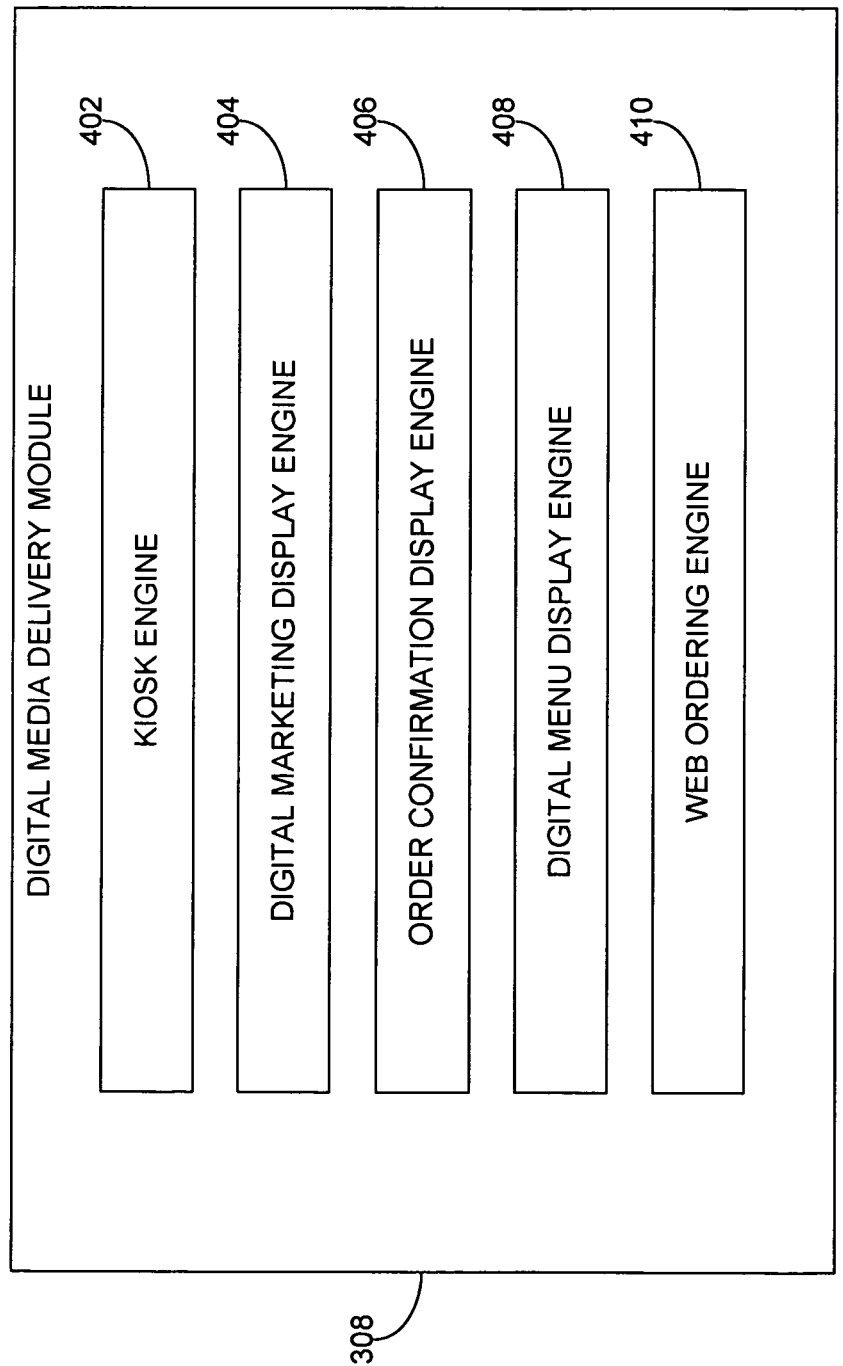
FIG. 4 is a block diagram providing more detailed view of the digital media delivery module shown in FIG. 3.

The operations area 104 of the QSR 100 may also include one or more digital media management appliances ("DMMA") 124. The DMMA 124 may take the form of a computer system which provides digital media management functionality from a dedicated hardware platform. Although the DMMA 124 is typically implemented as a computer appliance, a skilled artisan will readily appreciate that the functions of the DMMA may be carried out on a general purpose computing device that performs multiple functions within the QSR environment. In some embodiments the DMMA may be implemented as a Windows or Linux based server running digital media management software. The DMMA 124, which will be discussed in detail below in connection with FIGS. 3 and 4, is generally used to store, manage, synchronize, and deliver data to the digital display devices throughout the QSR environment 100. For example, the DMMA 124 may store menu data that is used to drive the digital menu display 116 and the customer operated kiosks 114. The DMMA may also store digital media that is used to drive the digital marketing displays 108 and the order confirmation displays 112 within the store 100.

The DMMA 124 may be also be connected to a wide area network interface 128 which allows the DMMA to send and receive data over a wide area network such as the Internet. In particular, the WAN interface 128 may provide a network connection from the DMMA 124 (as well as other devices in the QSR environment 100) to a media design module 126. The media design module 126 may be used to remotely create and configure the digital media displayed in the store. Typically, the media design module 126 is an externally hosted application that communicates with many different DMMA's located in many different QSR's within a brand. As a result, the media design module 126 may be used at the corporate level of the brand to publish digital content out to QSR franchisees. However, a skilled artisan will appreciate that the media design module 126 could be located on a server within the QSR environment 100, and the each store's staff could use the media design module 126 to configure the in store DMMA 124.

The DMMA 124 may also be configured to correlate data received from the media design software with data in the POS system 120. In some embodiments, a translation layer or service is provided which allows the DMMA 124 to communicate with various different POS implementations in a manner that is transparent to the user.

Figure 2:
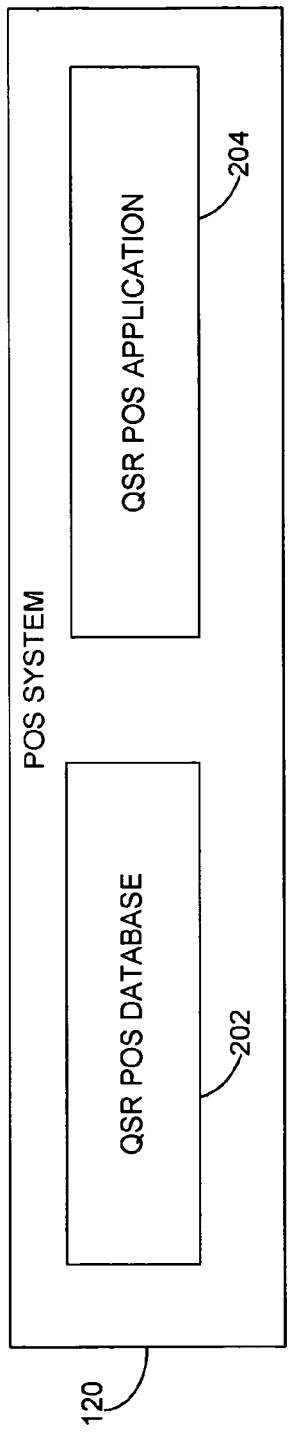
FIG. 2 is a block diagram providing more detailed view of the POS system shown in FIG. 1.

FIG. 2 is a block diagram providing more detailed view of the POS system shown in FIG. 1. As shown the POS system 120 may include a POS database 202. The POS database 202 may be a relational database that is used to store POS-related data in one or more related data tables. Alternatively, the POS database 202 may be a flat file type of database which stores data in a single table. Generally, the data stored in the POS database 202 is considered the "authoritative" data source in the QSR 100. Although the types of data stored in a particular location's POS database 202 may vary, the POS database 202 typically stores sales and inventory data, as well as menu data. Food products offered by the QSR to its customers may be identified by SKUs, which are unique identifiers of products. The POS system 120 also may include a POS application 204. The POS application 204 is application software that is used to maintain the POS database 202 and interact with the POS terminals 110 over the store network in order to receive orders inputted into the POS terminals 110. While a single QSR environment 100 usually includes only one POS system 120, it will be appreciated that several different QSR stores within the same QSR brand may implement different POS systems 120 within their respective QSR environments 100.

FIG. 3 is a block diagram providing a more detailed view of the digital media management appliance 124 from FIG. 1. As shown, the DMMA 124 includes a POS interface 302. The POS interface 302 provides the DMMA 124 with a connection to the POS system 120. The connection may be a network connection via a wired network, a wireless connection via a LAN, Bluetooth, or some other type of interface. The POS interface 302 allows the DMMA 124 to communicate (either directly or indirectly) with the POS system 120 to share and/or transfer data between DMMA 124 and POS system 120. The DMMA also may include digital media data 304. The digital media data 304 may include text and graphics and other media that may be sent to the various customer facing display devices within the QSR environment 100. The digital media data 304 may include menu data that is used to generate menus on the digital menu display 116. The menu data may include both menu items 118 and graphical images related to the store brand or the menu items. The digital media data may also include television data that is displayed on digital marketing display. The television data may include QSR branded advertising video which alerts customers 106 to promotions within the store. The digital media data 304 may also include graphical images (such as jpeg files, for example) which are related to advertising campaigns of the QSR brand. The digital media data 304 may also include, video, animations, sound and other data which may be used to provide interactive menus on the kiosks 114 and/or other digital media. Other types of digital media may also be used.

As noted previously, the DMMA 124 may be configured to drive one or more of the display devices in the QSR environment 100. In one sense, the DMMA 124 may act as a media player for each of the display devices. As a result, the DMMA 124 may also include one or more external display interfaces 306. The display interfaces 306 may include hardware and software that allows the DMMA 124 to drive the digital media displays located in the QSR environment. In some embodiments, the digital media display devices may be connected to the DMMA 124 via a digital visual interface (DVI) connection or through some other type of connectivity (such a VGA) may be used. The DMMA 124 may be configured with a plurality of video interface cards which allow connection to multiple external display devices. Additionally, the DMMA 124 may also act as a cache or intermediary media delivery device to one or more devices that drive the digital media display devices such as the Customer Operated Kiosk 114.

The DMMA 124 may also include a synchronization module 310. The synchronization module 310 may take the form of a software program or service which synchronizes data in the digital media data 304 with other data in the network such as the POS database 202 data. The synchronization module 310 may be used by the DMMA 124 to confirm that the data used to drive the various display devices in the QSR environment 100 is accurate and up to date. As noted above, POS database data 202 is generally considered "authoritative" in the QSR environment 100. Thus, the synchronization module may be configured to compare menu data stored in the digital media data 304 with the inventory data stored in the POS database. If the menu data and inventory data are inconsistent, the synchronization engine 310 may be configured to modify the menu data accordingly.

In various embodiments, data processed by the DMMA 124 may be passed to the POS system 120 via the POS interface 302. The underlying POS data structure is not typically suitable for creating the menu flows that are presented on the kiosk device 114. As a result, menu flows for the customer operated ordering points often utilize different underlying data structure and SKU identifiers. For example, a kiosk system 114 which is driven by the DMMA 124 may be required to share customer order data with the POS system so that customer orders can be immediately processed by the POS system and displayed on a kitchen display system 122. Because the structure of the menu data in the kiosk menu flow often differs from the underlying structure of the POS database 202, a data translation may be necessary for the POS system 120 to understand the data input received by the kiosk 114. Thus, a translation module 312 may be provided which is used to translate SKU data from the kiosk 114 or other customer inputted ordering device into a form understandable by the POS system 120. The translation module 312 may take the form of a translation layer as described in U.S. patent application Ser. No. 12/167,047, assigned to the owners of the present applications, and incorporated by reference herein in its entirety. Although the translation module 312 is shown as being a part of the DMMA, a skilled artisan can appreciate that the translation module could be implemented elsewhere in the QSR environment 100, such as for example at the POS system 120, on the kiosks 114, or in a dedicated translation system. The use of a translation module 312 allows the menu flow stored in the digital media data 304 to be completely decoupled from the POS structure, alleviating the need to consider the POS structure when designing menu flow. This decoupling ensures that the menu design is not compromised by an inflexible POS backend, but it also allows a single menu and code base to be implemented with several POS systems without needing to restructure or rewrite the code or restructure menu flow.

The DMMA 124 may further include one or more digital media delivery modules 308. In some embodiments, the digital media delivery module 308 may take the form of software which is configured to deliver specific digital media data 304 to specific digital display devices at specific times or in specific situations. FIG. 4 is a block diagram providing more detailed view of the digital media delivery module shown in FIG. 3. As shown, the digital media delivery module 308 may include various software engines which allow the DMMA 124 to generate display data for the various types of displays present in the QSR environment 100.

The delivery module 308 may include a kiosk engine 402. The kiosk engine 402 may take the form of a software module which is configured to generate menu data and other data which is used to drive the display on the kiosks 114. The kiosk engine may be configured to retrieve menu data from the digital media storage 304 and use the retrieved menu data to provide a menu ordering interface on the device. The delivery module 308 may also include a digital marketing display engine 404. The digital marketing display engine 404 may be a software module that is configured to retrieve marketing and promotional data from the digital media data 304 and deliver that data to the digital marketing display according to predefined rules. The digital media delivery module 308 may further include an order confirmation display engine 406. The order confirmation display engine 406 may take the form of a software module that may be used to drive the display on the order confirmation display 112. In some embodiments, the order confirmation display engine 406 may communicate with the POS system 120 to generate order confirmation data based on inputted orders. In addition, the order confirmation display 112 may be configured to retrieve promotional data from the digital media data 304 to display alongside order confirmation data.

A digital menu display engine 408 may also be provided as part of the digital media delivery module 308. The digital menu display engine 408 may be a software module that is configured to generate the menu for display on the digital menu display 116 based on a menu defined in the digital media data 304 of the DMMA 124. The digital menu display engine may be configured to update the digital menu display 116 in real time based on data received from the POS system 120 via the POS interface 302. In one embodiment, if the POS inventory data (stored in POS database 202) shows that inventory of a particular item 118 is depleted or otherwise unavailable, the digital menu display engine 408 may be configured to receive a message via the POS interface 302 and remove that item 118 from the digital menu display 116 in the QSR environment 100. Similarly, that item would be removed from the Customer Operated Kiosk 114 menu offerings.

The digital media delivery module 308 may also be configured with a web ordering engine 410. The web ordering engine 410 may take the form of a software module which generates a menu to transmit to requesting clients via a network protocol such as HTTP, WAP, or some other network protocol. The web ordering engine may generally take the form of a web-based application which utilizes the digital media data 304 to build web pages which receive customer food and drink orders. In one embodiment, customers may access a web page associated with the web ordering engine in order to input a food and/or drink order using web browsing software or some other client software. The web ordering engine may be configured to receive orders from customers 106 and deliver those order to the POS system 120 via the POS interface 302.

Figure 5:
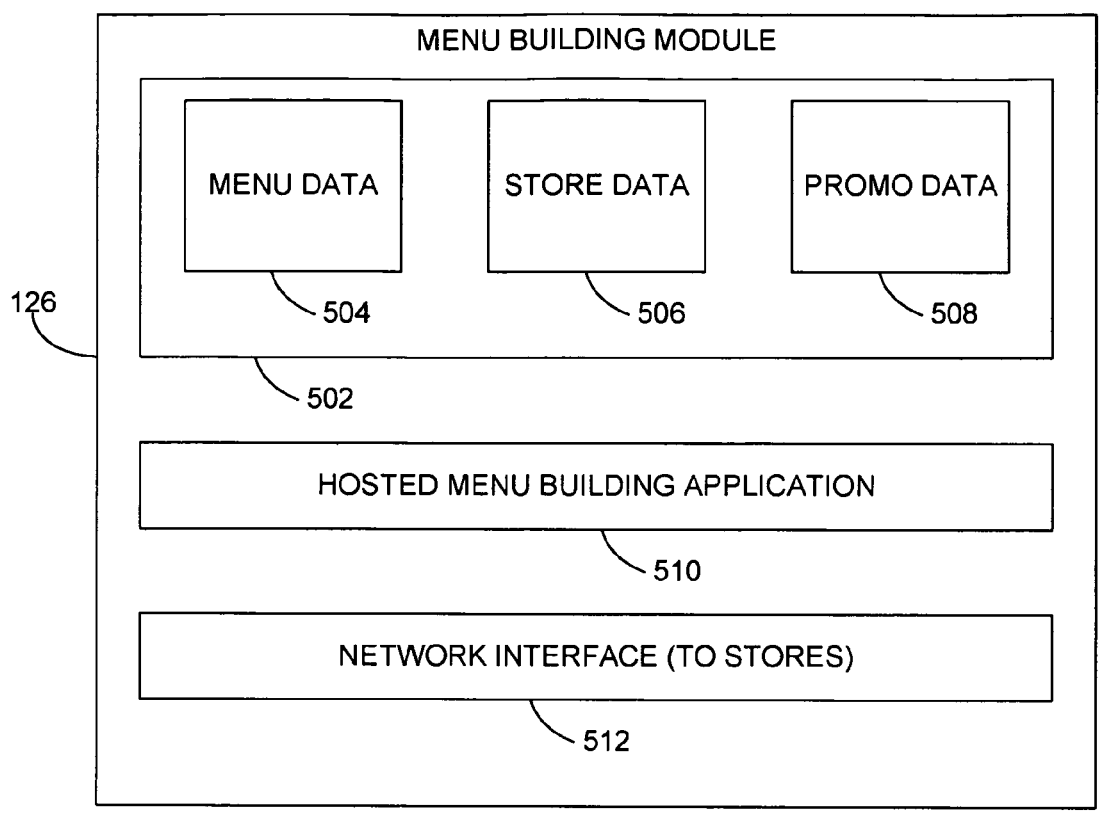
FIG. 5 is block diagram providing a more detailed view of the media design module from FIG. 1.

As noted briefly above, the DMMA 124 may work in conjunction with a media design module 126 which may be used to remotely configure the digital media displayed in the store. FIG. 5 is block diagram providing a more detailed view of the media design module shown in FIG. 1. The media design module 126 may include a menu building database 502. The database 502 may include menu data 504, store data 506, and historical menu data 508. The menu data 504 may include food and drink items and their associated default prices for display on media display devices. The menu data 504 may further define a menu flow for the presentation of the food and drink items in the display for selection on customer operated ordering devices such as the kiosk 114. The menu data 504 may also include data which may be used to drive digital menu displays 116 within the QSR environment 100.

The database 502 may also include store data 506. In a QSR franchise which includes many different franchisee operated stores, it is not uncommon for menus to vary depending on geographical region or other factors. For example, although franchises typically try to maintain consistency across all of their stores, a store in Texas may include certain menu items (not included in stores in other locations) that appear to its regional tastes. In addition, when franchises begin to introduce new products into their menus, it is not uncommon for a small selection of QSR stores to be selected as "testing" franchises. Accordingly, the media design module may maintain record related to many different stores. The menu building data 502 may also store promotional data 508. The promotional data 508 may include data related to product promotions and other brand enhancing activities.

The media design module 126 may further include a menu building application 510 which is used to define menu flows and rules regarding promotional media from the data stored in the menu building database 502. The menu building application 126 may be a hosted application on a general purpose computer (such as a application or web server running Linux) that is accessible via a web browser, or it may be a stand alone application that runs on a computer at a corporate location. Alternatively, the menu building application could run as part of the DMMA 126 in the QSR environment 100. A user may generate product menus using the menu building application and may further develop promotional media which may be used in conjunction with digital marketing displays 108 or ordering confirmation displays 112 in the QSR environment 100. The media design module 126 also may include a network interface 512. The network interface 512 may be a standard network interface card. In some embodiments, the media design module 126 may be configured to deliver menu data to one or more DMMA's 124 in one or more stores (as identified in the store data 506) via a wide area network such as the Internet.

Figure 6:
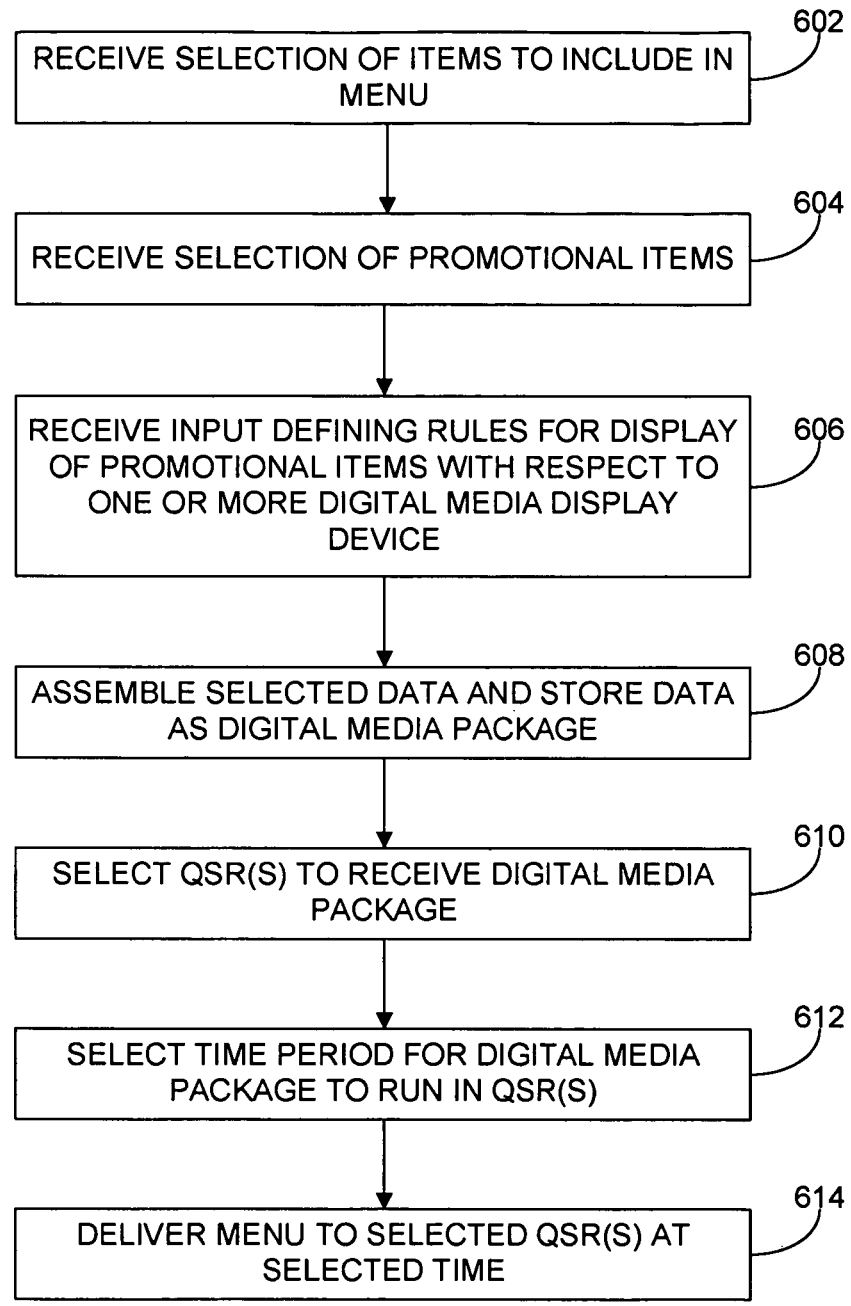
FIG. 6 is flowchart illustrating an exemplary a process by which a QSR menu is generated and delivered to a QSR in accordance with one or more embodiments.

The media design module described in connection with FIG. 5 may be used to create and deliver digital menus and other digital promotion media to QSR restaurants via a computer network. FIG. 6 is flowchart illustrating one example of a process by which a menu is generated and delivered to a QSR by the media design module 126 in accordance with one or more embodiments. The process begins at block 602, where the menu building application 510 receives a selection of items to include a product menu. In some embodiments, the items may be stored in the menu data 504 and made available for selection and compilation into a user menu via an application interface provided by the menu building application 510. Next, the process moves to block 604, where the menu building application 510 receives a selection of promotion items to include in the digital media data package to send to the QSR. The promotion items may be selected from the promotional data 508 stored in the menu building database 502.

The process next moves to block 606, where the user may define rules for displaying the selected promotional items on the digital media display devices in the QSR environment. Various rules may be defined, stored, and reused among many different product menu and marketing display implementations. For example, a rule may be defined such that promotional items related to breakfast meals should be displayed only in the morning, and promotional items related to lunch and dinner be displayed at other times. Up selling rules may also be defined such that certain up selling opportunities may be presented in the digital media depending upon the types of products ordered by a customer 106. For example, if a customer orders a hamburger and a soft drink at a POS terminal 110, the corresponding order confirmation display 112 may, in addition to displaying the customer order, flash a picture of French fries and ask the customer if they wish to include fries with their order.

Once the rules have been defined, the process then moves to block 608, where the selected menu items, the selected promotional items, and the defined rules may be integrated into a QSR digital media package and stored for later delivery to one or more QSR's 100. Once the digital media package has been stored, the process moves to block 610, where the user may select the specific a QSR or multiple QSR's to receive the digital media package. Once the QSR's have been selected, the process moves to block 612, where the time frame for running the digital media package may be defined. The time frame may be defined on a per store basis, or more generally. Once the time frames have been selected, the process then moves to block 614 where the digital media package is transmitted to the selected QSR's and stored in the digital media data 304 of the DMMA 124 (where it may be distributed accordingly).

Figure 7:
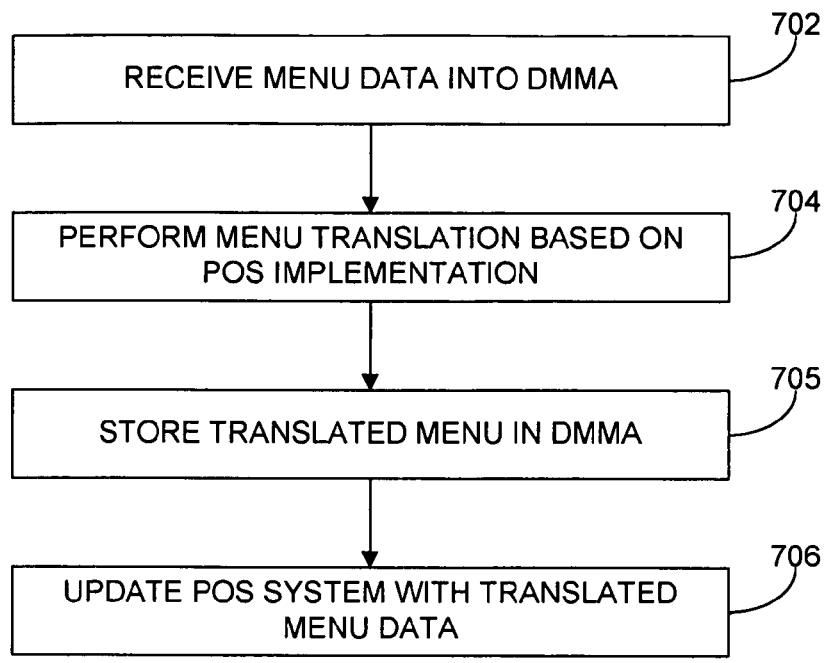
FIG. 7 is a flowchart illustrating a process by which a digital media management appliance can integrate with a POS system.

Because the digital media package delivered to a QSR often includes product updates and menu updates, and the POS system 120 is typically considered "authoritative" as the source for data within a QSR environment 100, it is often desirable for the product and menu updates to be shared with the POS system 120 when they are received by the DMMA 124. As noted previously, the structure of the menu data as delivered to the DMMA 124 may be different from the structure of the data as stored in the POS system 120. In some aspects of the invention, the DMMA 124 may use its translation module 312 to translate the menu and product data in digital media package and update the POS system 120 accordingly. FIG. 7 is a flowchart illustrating a process by which the DMMA 124 can integrate the digital media data with the POS system 120. The process begins at block 702, where the menu data is received into the DMMA 124. As noted above, the menu data may included in a digital media package which is generated in the media design module 126 and transmitted over a network to the DMMA 124. Next, the process moves to block 704, where the translation module 312 performs a menu translation that is specific to the POS system 120 in use in the QSR environment 100. As noted above, the translation may be performed using the techniques described in U.S. patent application Ser. No. 12/167,047. The translated menu data is then stored in the DMMA at block 705 and may then stored in the POS database 202 at block 706. By utilizing the translation layer to update the POS system 120, a menu developer may develop a single menu using the menu building application 510, and deliver that menu to QSR using various different POS implementations without needing to modify the menu structure to accommodate the POS implementation in each location.

Figure 8:
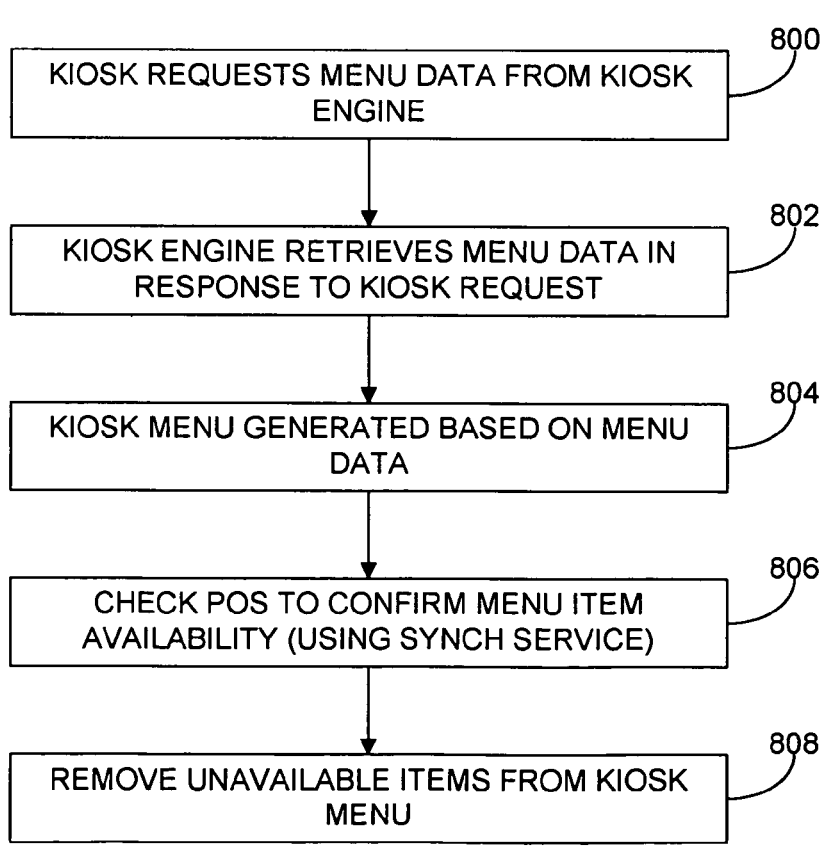
FIG. 8 is a flowchart illustrating a process for driving a self-service ordering kiosk using a digital media management appliance.

In some additional embodiments, digital media package delivered to and stored in the DMMA may be used to drive the customer-operated kiosk devices 114 in the QSR environment. FIG. 8 is a flowchart illustrating a process for driving a self-service ordering kiosk 114 of FIG. 1 using the digital media delivery module 308 of the DMMA 124. The process begins at block 800, where a kiosk 114 in the QSR environment requests a menu from the kiosk engine 800. Typically, the kiosk 114 does not display a menu until a user activates the ordering process on the kiosk 114. Instead, when the kiosk is not in use, it may display promotional items. When the user activates the ordering process, however, the kiosk 114 may send a request to the kiosk engine 402 for a menu to be generated on the kiosk display. Next, at block 802, the kiosk engine 402 of the digital media delivery module 308 retrieves menu data from the digital media data store 304 of the DMMA 124. Based on the menu data retrieved from the digital media data store 304, a kiosk menu is generated. The kiosk menu may include various product items that are available for ordering by QSR customers 106. As briefly noted above, the DMMA 124 may provide the ability for the product menu to reflect inventory conditions within the QSR environment 100. The DMMA 124 may leverage the synchronization service 124 to check menu item availability in the POS system 120. For example, the POS inventory make be checked to ensure that each of the menu items is available in the store. If menu items are missing, the items associated with those ingredients may be removed from the kiosk menu at block 808.

Figure 9:
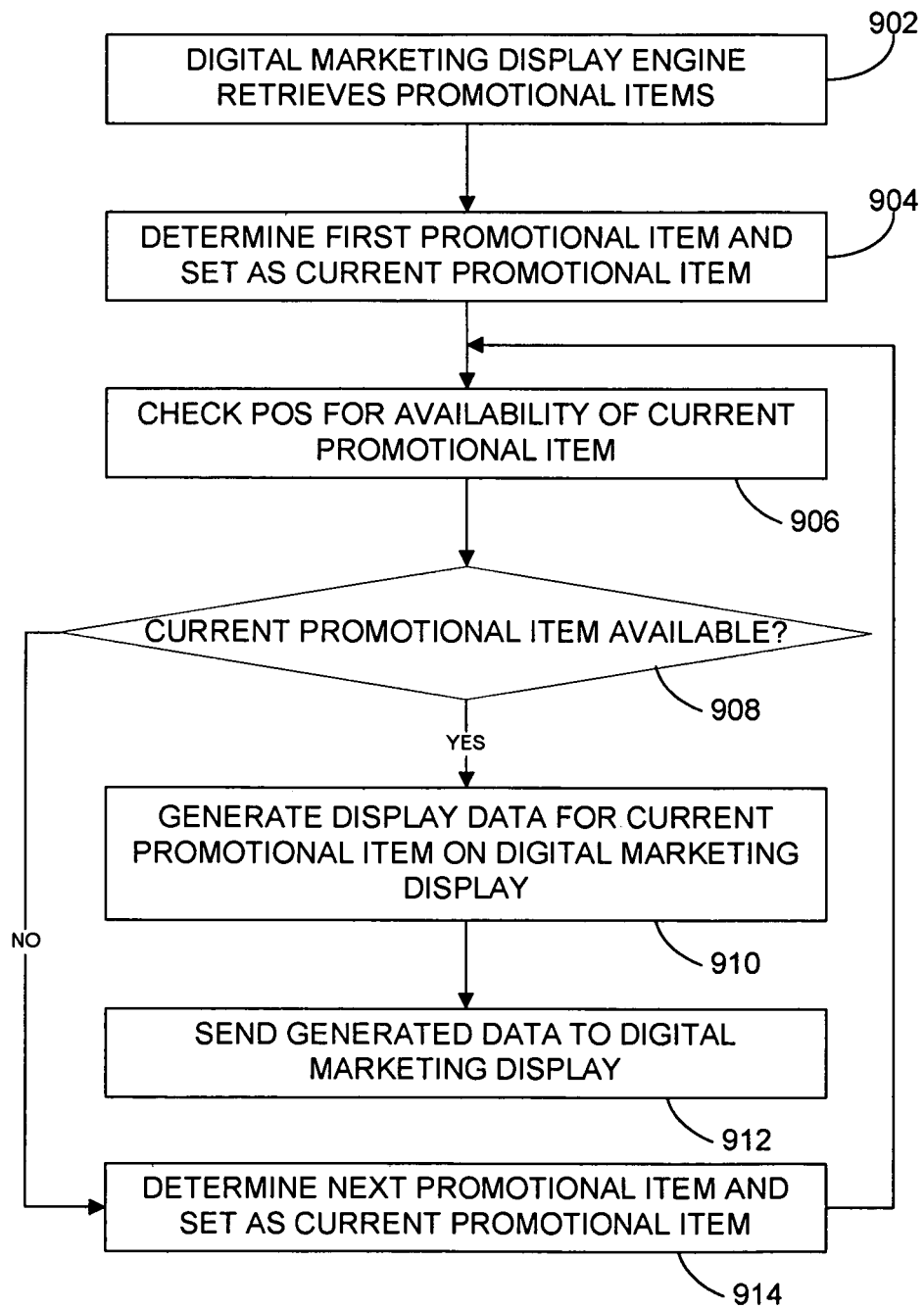
FIG. 9 is a flowchart of illustrating a process for driving a digital display of promotional items wherein a digital marketing display is used as an example to illustrate the process.

In still other embodiments, the DMMA 124 may be used to drive one or more digital marketing displays 108 within the QSR environment 100. FIG. 9 is a flowchart of illustrating an exemplary process by which the DMMA 124 may drive the digital marketing display 108. The process begins at block 902, where the digital marketing display engine 404 retrieves promotional items from the digital media data 304 to display on the digital marketing display 108. Next, the process moves to block 904, where the digital marketing display engine 404 determines the first promotional item to be displayed on the digital display device sets that item as the current item for display. Next, the process moves to block 906 where the POS system 120 is checked to ensure that the item being promoted is available for purchase in the QSR. Next, at decision block 908, if the item is not available, the process moves to block 914 where the digital marketing display engine 404 determines the next promotional item available in the digital media data 304, sets that item as the current item to display, and returns to block 906. If at decision block 908 the current promotion item is available, the process moves to block 910 where display data is generated for the current promotional item. The generated display data is then delivered by the digital marketing display engine 404 to the digital marketing display 108 and displayed thereon. Utilizing the process described above, the DMMA 124 only displays promotional materials for those items immediately available to customers in the QSR environment.

Figure 10:
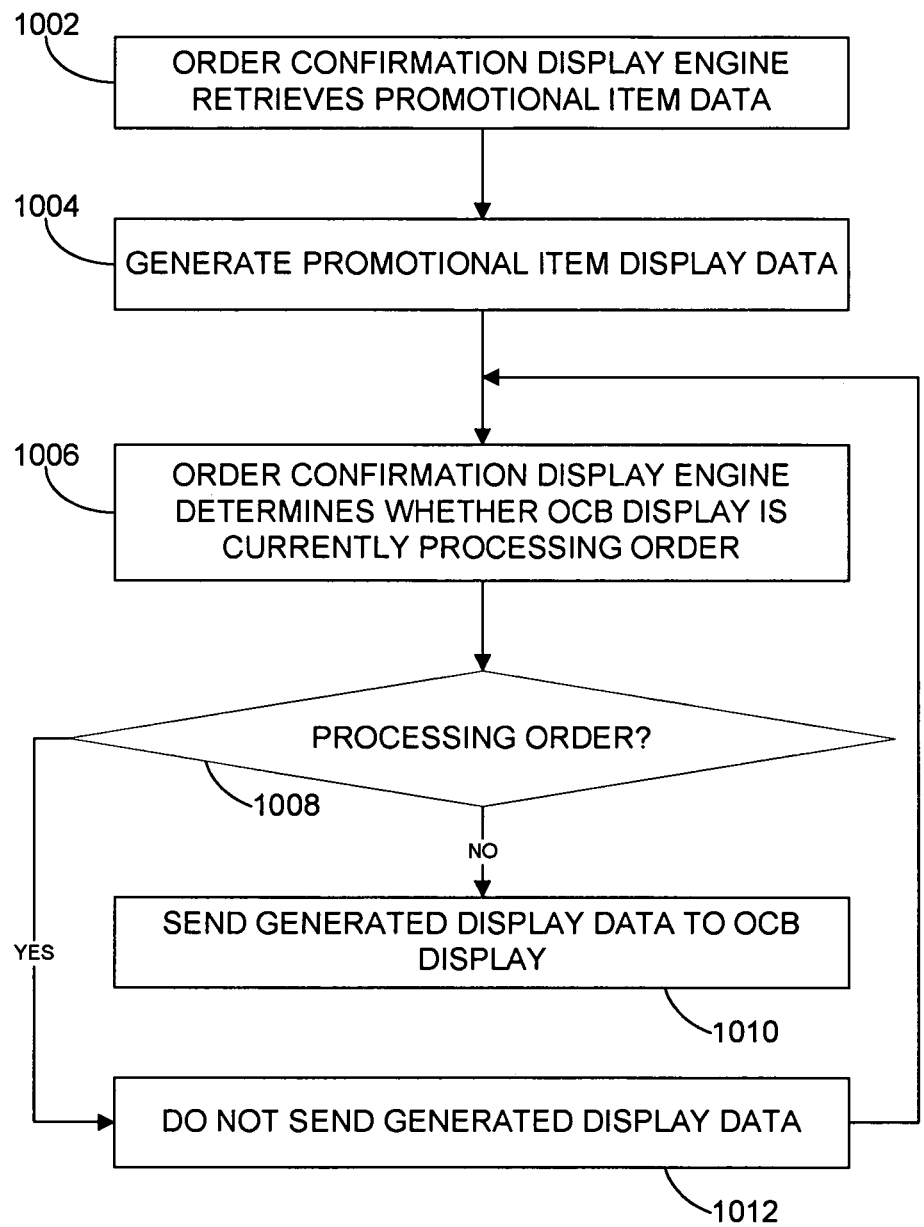
FIG. 10 is a flowchart illustrating a process by which the digital media management appliance can deliver promotional display data to an order confirmation display.

In still other embodiments, the DMMA 124 may be used to manage the content displayed on order confirmation displays 112 in the QSR environment. FIG. 10 is a flowchart illustrating one method by which the DMMA 124 can deliver promotional display data to an order confirmation display 112. The process begins at block 1002, where the order confirmation display engine 406 retrieves promotional data from the digital media data 304. The process next moves to block 1004, where the order confirmation display engine 406 generates display data for the selected promotional item. Next, at block 1006, the order confirmation display engine 406 determines whether the order confirmation display is currently processing an order. At decision block 1008, if the order confirmation display is currently displaying an order to a customer, the process jumps to block 1012 and the generated display data is not sent to the order confirmation display 112, and the process returns to block 1006. If the order confirmation display is idle at decision block 1008, the generated display data is sent to the order confirmation display 112, and the promotional item data is displayed on the order confirmation device. The embodiment described in connection with FIG. 10 does not allow for promotional data to be displayed alongside order confirmation data. However, a skilled artisan will appreciate that the order confirmation display engine 406 may be configured to display promotional data alongside order confirmation data in accordance with rules defined in the media design module 126 as described above.

Figure 11:
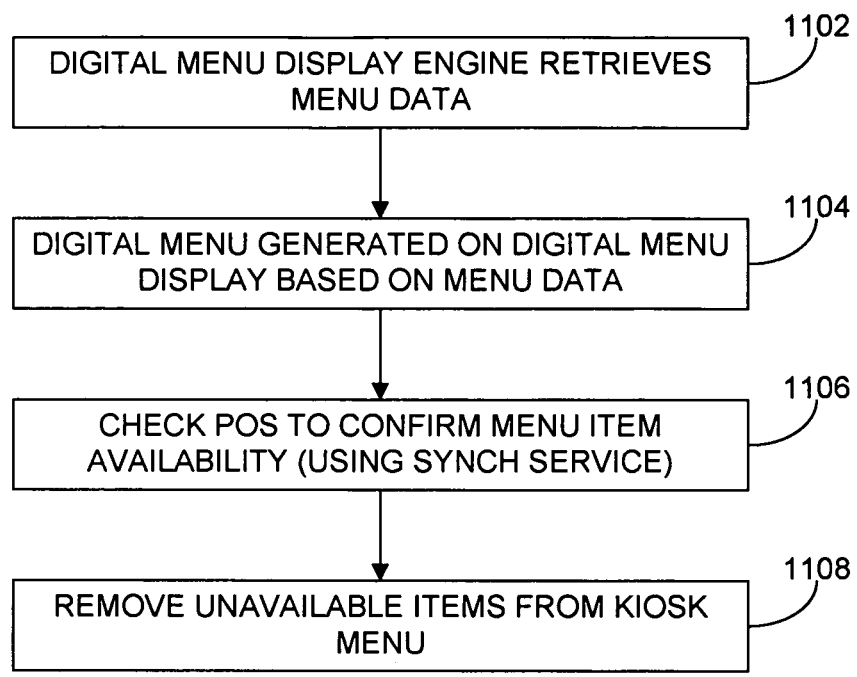
FIG. 11 is a flowchart illustrating how a menu may be generated for a digital menu display in accordance with one or more embodiments.

As noted previously, the DMMA 124 may also be used to control the digital menu display 116 in the QSR environment 100. FIG. 11 is a flowchart illustrating how a menu may be generated and maintained for a digital menu display in accordance with one or more embodiments. The process begins at block 1102, where the digital menu display engine 408 retrieves menu data from the digital media data 304. This data may include both item data and graphics data to be displayed on the digital menu display device 116. Next, the process moves to block 1104, where the engine 408 generates the display data based on the retrieved menu data. As noted previously, the digital media data may define both items to include in a menu and a specific menu flow or product placement for the menu. Next, at block 1106, the engine 408 checks with the POS system 120 to confirm that each menu item on the menu is available. This check may be carried out by the synchronization service 310, the translation module 312, or both. The process next moves to block 1108, where the unavailable items are removed from the menu, and the menu is generated on the display 116. It is to be appreciated that the digital menu display engine may be further configured to check the POS system 120 periodically to determine whether any items 118 should be removed from the menu displayed on the digital menu display 116 due to item unavailability.

Figure 12:
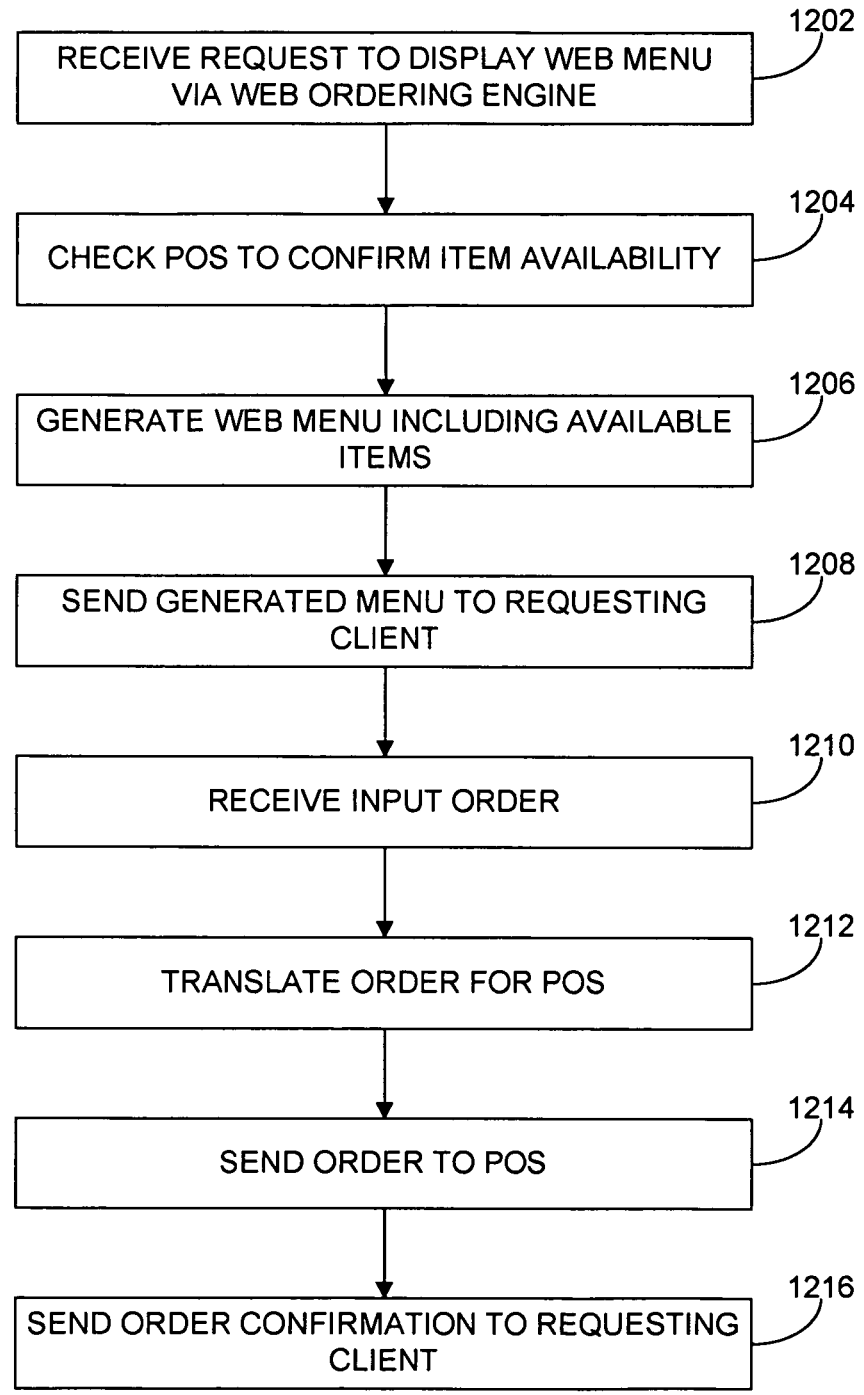
FIG. 12 is a flowchart illustrating how a web-based ordering process in which an order may be routed through a digital media management appliance to POS system.

As noted above, additional aspects of the invention provide for a web interface that is provided by the DMMA 124 and receives customer orders via the Internet or some other network. FIG. 12 is a flowchart illustrating an exemplary web-based ordering process in which an order is routed through the DMMA 124 and into the POS system 120 for processing. The process begins at block 1202, where the web ordering engine 410 receives a request to send menu data to a requesting client. The process then moves to block 1204, where the web ordering engine 410 checks the POS system 120 to confirm item availability. As discussed previously, this check may be performed in cooperation with the translation module 312 and/or the synchronization module 310 to extract the data from the POS system 120. Next, the web-based menu data is generated from the available items at block 1206, and the data is sent over the network to the requesting client at block 1208. The process then moves to block 1210, where an order is received from the client by the web ordering engine 410. The web ordering engine 410 may then pass the inputted order to the translation module 312, which translates the order data into a format readable by the POS system 120 at block 1212. Once the order data has been translated, it is stored in the POS system 120 at block 1214 and a confirmation of order receipt may be sent to the requesting client at block 1216.

Figure 13:
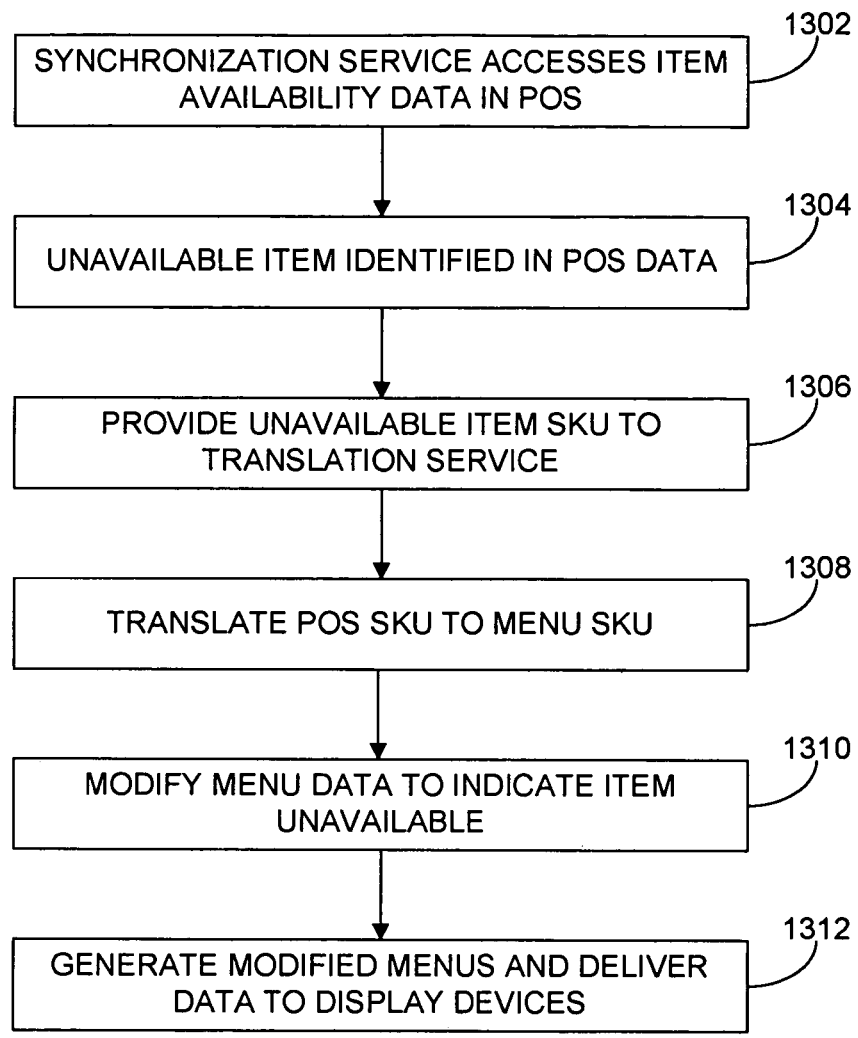
FIG. 13 is a flowchart of a synchronization process which may be used to maintain updated menus.

In still other embodiments, the DMMA 124 may be configured to maintain menus in real time across multiple display devices in the QSR environment. FIG. 13 is a flowchart of a synchronization process which may be used to maintain updated menus across the each of the display devices in the customer present area 102 of the QSR environment 100. The process begins at block 1302, where the synchronization module 310 of the DMMA 124 sends a request to the POS system 120 for a list of all unavailable product items. Next, the process moves to block 1304, where the POS system identifies unavailable items 118 and send the SKU's associated with those items to the DMMA 124. Next the SKU from the POS system 120 is provided to the translation module 312 at block 1306, and the translation module 312 converts the POS SKU into a menu SKU at block 1308. Once the unavailable menu SKU (or SKU's) have been identified, those items are marked as unavailable in the product menu data stored in the digital media data 304 at block 1310. From the modified menu data, new menus are generated by the respective software engines in the DMMA 124, and the new menus are delivered to the appropriate display devices at block 1312. temporarily from the product menu data at has been accesses item availability data in the POS system 120.

Utilizing the embodiments described above, cost effective and timely QSR menu management services may be provided via a single interface point that connects to each of the customer facing display devices and simultaneously integrates with the in store POS system to ensure accurate and timely data. Further, using the translation module of the DMMA, changes made to the POS data may be reflected in the digital media data and correlated with the digital content in the customer present areas of the store. Further, by concentrating the digital display media in a single location, it is much easier for a brand to maintain a consistent branding experience across each of the customer interaction points within the QSR brand and across POS and digital media display vendors.

Those of skill will recognize that the various illustrative logical blocks, modules, circuits, and algorithm steps described in connection with the embodiments disclosed herein may be implemented as electronic hardware such as a general purpose or special purpose computer, computer software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A system for managing digital display content in a plurality of quick service restaurant (QSR) environments, comprising:
    a digital media delivery module configured to execute computer instructions on a processor which generates digital media data for a plurality of digital media devices in the QSR environments, the plurality of digital media devices including at least one digital menu display device;
    a computer memory in each QSR environment configured to store the digital media data;
    a point of sale interface configured to communicate with a point of sale system in each of the QSR environments;
    a menu building module remote from the QSR environments and configured to:
        receive a selection of menu items from menu data to include in a product menu;
        receive a selection of promotional items from promotional data;
        receive a definition of rules for displaying the promotional items;

assemble the selection of menu items, the selection of promotional items, and the definition of rules into a digital media package; and transmit the same digital media package to the QSR environments for storage in the respective computer memory of each QSR environment;

a synchronization module configured to:
monitor point of sale data stored in the point of sale system and update the digital media data based upon a change to the point of sale data;
access the digital media package from the computer memory and modify the point of sale data to reflect the digital media package; and a translation module configured to receive the digital media data from the memory and translate the digital media data into a format readable by the point of sale system, wherein a structure of the digital media data as stored in the memory is incompatible with the point of sale data stored in the point of sale system, wherein the synchronization module is further configured to maintain consistency between the digital media data and the point of sale data.

2. The system of claim 1, wherein the system comprises a digital media management appliance.

3. The system of claim 1, wherein:
the plurality of digital media devices in the QSR environments further includes at least one of:
one or more kiosk device;
one or more digital marketing display device; and
one or more digital confirmation display device; and
the digital media delivery module comprises at least two of:
a kiosk engine configured to generate a kiosk menu for display on the one or more kiosk device;
a digital marketing display engine configured to play multimedia files indicative of food items on the one or more digital marketing display device;
an order confirmation display engine configured to display an order confirmation on the one or more digital confirmation display device; and
a digital menu display engine configured to display a QSR menu on the one or more digital menu display device;
wherein, each engine is configured for generating a display on its respective digital media device.

4. The system of claim 3, wherein the digital marketing display device comprises a LCD television device in communication with the digital marketing display engine via a DVI interface.

5. The system of claim 3, wherein the digital media delivery module further comprises a web ordering engine configured to generate web pages for ordering products in the QSR environment.

6. The system of claim 1, wherein the menu building module is further configured to:
receive a selection of QSRs to receive the digital media package;
receive a time frame for running the digital media package, the time frame selectable on a per QSR basis; and
transmit the digital media package to the selected QSRs.

7. The system of claim 3, wherein the definition of rules comprises up selling rules which specify up selling opportunities presented in the digital media data based on types of products ordered by a customer.

8. The system of claim 1, wherein the digital media data comprises digital menu data.

9. A method of managing digital display content in a plurality of quick service restaurant (QSR) environments, the method comprising:
generating digital media data for a plurality of digital media devices in the QSR environments, the plurality of digital media devices including at least one digital menu display device, the digital media data including a digital menu, and wherein the generating the digital menu is remote from a plurality of QSRs and comprises:
receiving a selection of menu items from menu data to include in a product menu;
receiving a selection of promotional items from promotional data;
receiving a definition of rules for displaying the promotional items;
assembling the selection of menu items, the selection of promotional items, and the definition of rules into a digital media package; and
transmitting the same digital media package to the QSR environments for storage in a respective computer memory of each QSR environment;
storing the digital media data in the computer memory in each QSR environment;
communicating with a point of sale system in each QSR environment;
monitoring point of sale data stored in each point of sale system and updating the digital media data based upon a change to the point of sale data;
performing synchronization functions to maintain consistency between the digital media data and the point of sale data, the synchronization functions including accessing the digital media package from the computer memory and modifying the point of sale data to reflect the digital media package; and
translating the digital media data into a format readable by the point of sale system, wherein a structure of the digital media data as stored in the memory is incompatible with the point of sale data stored in the point of sale system,
wherein the translating the digital media data further comprises translating the digital media data into a plurality of formats, each format being associated with a different point of sale system, and
wherein the method is performed by one or more computer processors.

10. The method of claim 9, wherein:
the plurality of digital media devices in the QSR environments further includes at least one of:
one or more kiosk device;
one or more digital marketing display device; and
one or more digital confirmation display device; and
the digital media data is generated for at least of:
a kiosk engine configured to generate a kiosk menu for display on the one or more kiosk device;
a digital marketing display engine configured to play multimedia files indicative of food items on the one or more digital menu display device;
an order confirmation display engine configured to display an order confirmation on the one or more digital confirmation device; and
a digital menu display engine configured to display a QSR menu on the one or more digital menu display device;
wherein, each engine is configured for generating a display on its respective digital media device.

11. The method of claim 10, wherein the digital marketing display device is a LCD television device in communication with a digital marketing display engine via a DVI interface.

12. The method of claim 10, further comprising generating web pages for ordering products in the QSR environment based on the stored digital media data.

13. The method of claim 9, wherein the generating the digital menu further comprises:
   receiving a selection of QSRs to receive the digital media package;
   receiving a time frame for running the digital media package, the time frame selectable on a per QSR basis; and
   transmitting the digital media package to the selected QSR.

* * * * *